United States Patent [19]

Pratt

[11] 4,285,924

[45] Aug. 25, 1981

[54] SEPARATION OF ACIDS

[75] Inventor: Michael W. T. Pratt, Bingley, England

[73] Assignee: National Research Development Corp., London, England

[21] Appl. No.: 136,954

[22] Filed: Apr. 3, 1980

[30] Foreign Application Priority Data

Apr. 4, 1979 [GB] United Kingdom ............... 11855/79

[51] Int. Cl.$^3$ ............................................. C01B 21/46
[52] U.S. Cl. ................................. 423/390; 423/321 S; 423/523; 423/531
[58] Field of Search ............... 423/390, 523, 531, 321; 210/638

[56] References Cited

U.S. PATENT DOCUMENTS 2,971,819  2/1961  Antelman ............................. 423/523
3,367,749  2/1968  Koerner .............................. 423/321

OTHER PUBLICATIONS

Schmidt, "Amine Extraction", Israel Programme for Sci. Translations, Israel, 1971, pp. 40–68.
Agers, D. W. et al., "Purification of Inorg. Acids by Amine Liq. Ion Exchange Process", Am. Inst. Mining, Metall., & Pet. Engng., Dallas, Texas 1963 (preprint).
Bertocci, U. et al., "J. Inorg. Nucl. Chem.", 1961, pp. 323–332.
Verstegen, J., "J. Inorg. Nucl. Chem.", 1964, pp. 1085–1102.
Baroncelli, F. et al., "J. Inorg. Nucl. Chem.", 1962, pp. 405–413.

Primary Examiner—G. O. Peters
Attorney, Agent, or Firm—Oblon, Fisher, Spivak, McClelland & Maier

[57] ABSTRACT

A method for the separation of nitric acid from a mixture of nitric acid with one or more of phosphoric, sulphuric or hydrochloric acids, in which the nitric acid is selectively extracted from a first phase comprising the acid mixture into a second phase by an amine nitrate. The method may conveniently be carried into effect by treating an aqueous mixture of acids with kerosene containing tri-n-octylamine nitrate and a modifyier e.g. decanol following which the excess nitric acid is stripped from the kerosene phase by water or dilute nitric acid.

12 Claims, No Drawings

SEPARATION OF ACIDS

This invention relates to the separation of acids.

Accordingly the present invention comprises a method for the separation of nitric acid from a mixture of nitric acid with one or more of phosphoric, sulphuric or hydrochloric acids, in which the nitric acid is selectively extracted from a first phase comprising the acid mixture into a second phase by an amine nitrate.

Although, should free amine be present in the second phase, acid may be extracted thereby from the first phase to form the amine nitrate, the amount of acid extracted in this manner is minor, usually amounting to no more than 10% e.g. 1% or less of the acid extracted. Extraction is thus carried out at least predominantly and usually wholly by the nitrate.

The nitrates employed as extractants are preferably those of long chain amines which may contain at least 6 and usually contain at least 8 carbon atoms and may be primary, although secondary or tertiary amines are especially preferred. Amine nitrates include those of trioctylamine and Amberlite LA-1, a secondary amine with a molecular weight of 351.40. The nitrates generally have the formula: $R^1R^2R^3N \cdot HNO_3$ in which at least one of $R^1 R^2$ and $R^3$ represents a substituted or unsubstituted alkyl group and the remainder represent hydrogen or a substituted or unsubstituted alkyl group. It is considered that complexes are formed between the nitrates and extracted acids which may be formulated as $[R^1R^2R^3NHNO_3]HNO_3$.

The first phase, which is usually highly polar, is normally aqueous and the second phase containing the amine nitrate is generally significantly less polar than the first and may comprise for example substituted, e.g. nitro or chloro substituted aromatic or aliphatic hydrocarbons such as nitrobenzene hydrocarbons 2-nitropropane, chloroform, carbon tetrachloride or unsubstituted hydrocarbons such as kerosene, heptane, cyclohexane, benzene, toluene, xylene or butylbenzene. It may be desirable to add to the second phase a modifying substance such as decanol, octanol or other alcohol with low aqueous solubility the function of which is to suppress formation of further phases so that a clean separation of the first and second phases can be effected. Commonly about 12% modifying substance is added.

The required nitrate may be prepared by treating the free amine in the solvent of the second phase, which preferably contains a modifying agent, with an excess of aqueous nitric acid. Agitation of the mixture is usually desirable following which the phases are separated and excess acid is washed from the second phase with water to leave the salt in the second phase.

Care is required with strongly oxidising acids to ensure that the concentration is kept below the level at which the nitrate is degraded. For example it is usually undesirable for the total acid concentration to exceed 10 M.

In general the concentration of the nitrate lies in the range 5–50% by volume of the extractant phase.

The separation factor is normally affected only slightly by temperature and in general the phases are separated at ambient temperature.

In a typical separation procedure the first phase comprising a mixed acid feed is treated in an extractor with a counter-current flow of a second phase comprising the amine nitrate. The loaded second phase is then washed with a counter-current flow of water or alternatively dilute nitric acid, e.g. nitric acid at a concentration not exceeding 0.1 M, which is capable of facilitating phase separation. The temperature of the water or acid usually lies between 0° C. and 100° C., and is commonly at ambient temperature. Washing regenerates the uncomplexed amine nitrate and liberates the extracted acid which can be concentrated if so desired. The amine nitrate, which may contain a minor proportion, usually less than 10%, e g. 1% or less of free amine produced by hydrolysis is re-used in further extraction steps. The raffinate from the extraction stage may be used in chemical synthesis or be further treated to yield the acid therein.

When a high degree of separation of acids in the feed mixture is required several contact stages may be needed in a counter-current flow system but a significant decrease of the ratio of nitric to other acids in the feed may be achieved in a single contact stage.

The invention is illustrated by the following Examples.

EXAMPLES 1–29

The present Examples illustrate the separation of nitric and phosphoric acids and nitric and sulphuric acids. In all cases the precursor of the nitrate extractant is tri-n-octylamine which is carried in a kerosene diluent containing 12% n-decanol as modifier. A mixture of the aqueous acids is contacted with an equal volume of the tri-octylamine phase at 25° C. and the results of equilibration are shown in Tables I and II. In addition to showing the total amount of nitric acid transferring to the organic phase (which includes nitric acid forming the amine nitrate present therein) the Tables also show the excess nitric acid present at equilibrium. On contact of the laden organic phase with an equal volume of water, essentially all the excess nitric acid and the other acid (phosphoric or sulphuric) is transferred to the aqueous phase in all cases. In the Tables, terms in square brackets represent molar concentrations; subscripts a and o denote aqueous and organic phases respectively.

TABLE I

| | | Initial Concs. | | Equilibrium Concentrations M | | | | |
|---|---|---|---|---|---|---|---|---|
| | | | | | | Organic Phase | | |
| | $[TOA]_o$ | | | Aqueous Phase | | total | excess | |
| Example | M (% v/v) | $[HNO_3]_a$ | $[H_3PO_4]_a$ | $[HNO_3]_a$ | $[H_3PO_4]_a$ | $[HNO_3]_o$ | $[HNO_3]_o$ | $[H_3PO_4]_o$ |
| 1 | 0.45 | 3.00 | 2.00 | 2.40 | 1.98 | 0.60 | 0.15 | 0.02 |
| 2 | (20%) | 3.96 | 2.00 | 3.25 | 1.98 | 0.71 | 0.26 | 0.02 |
| 3 | | 6.03 | 2.00 | 4.15 | 1.98 | 0.88 | 0.43 | 0.02 |
| 4 | | 8.04 | 2.00 | 7.00 | 1.99 | 1.04 | 0.59 | 0.01 |
| 5 | | 2.93 | 4.00 | 2.35 | 3.98 | 0.58 | 0.13 | 0.02 |
| 6 | | 5.95 | 4.00 | 5.10 | 3.99 | 0.85 | 0.40 | 0.01 |
| 7 | | 2.02 | 6.00 | 1.50 | 5.96 | 0.52 | 0.07 | 0.04 |
| 8 | | 3.95 | 6.00 | 3.25 | 5.98 | 0.70 | 0.25 | 0.02 |

Table I header: Separation of Mixtures of Nitric and Phosphoric Acids

TABLE I-continued

Separation of Mixtures of Nitric and Phosphoric Acids

| | | Initial Concs. | | Equilibrium Concentrations M | | | | |
| | $[TOA]_o$ | | | Aqueous Phase | | Organic Phase | | |
| | M | M | | | | total | excess | |
| Example | (% v/v) | $[HNO_3]_a$ | $[H_3PO_4]_a$ | $[HNO_3]_a$ | $[H_3PO_4]_a$ | $[HNO_3]_o$ | $[HNO_3]_o$ | $[H_3PO_4]_o$ |
|---|---|---|---|---|---|---|---|---|
| 9 | | 2.01 | 8.00 | 1.50 | 7.95 | 0.51 | 0.06 | 0.05 |
| 10 | 0.91 | 4.03 | 2.00 | 2.65 | 1.97 | 1.38 | 0.47 | 0.03 |
| 11 | (40%) | 6.09 | 2.00 | 4.55 | 1.98 | 1.54 | 0.63 | 0.02 |
| 12 | | 7.95 | 2.00 | 6.35 | 1.99 | 1.60 | 0.69 | 0.01 |
| 13 | | 1.98 | 4.00 | 0.97 | 3.91 | 1.01 | 0.10 | 0.09 |
| 14 | | 4.92 | 4.00 | 3.45 | 3.98 | 1.47 | 0.56 | 0.02 |
| 15 | | 2.01 | 6.00 | 1.00 | 5.90 | 1.01 | 0.10 | 0.10 |
| 16 | | 4.02 | 6.00 | 2.65 | 5.96 | 1.37 | 0.46 | 0.04 |
| 17 | 1.13 | 5.00 | 0.50 | 3.45 | 0.47 | 1.55 | 0.42 | 0.03 |
| 18 | (50%) | 9.02 | 0.50 | 7.30 | 0.48 | 1.72 | 0.59 | 0.02 |
| 19 | | 2.00 | 4.00 | 0.80 | 3.88 | 1.20 | 0.07 | 0.12 |
| 20 | | 4.04 | 4.00 | 2.55 | 3.98 | 1.49 | 0.36 | 0.05 |
| 21 | | 5.95 | 4.00 | 4.35 | 3.98 | 1.60 | 0.47 | 0.02 |

TABLE II

Separation of Mixtures of Nitric and Sulphuric Acids

| | | Initial Concs. | | Equilibrium Concentrations M | | | | |
| | $[TOA]_o$ | | | Aqueous Phase | | Organic Phase | | |
| | M | M | | | | total | excess | |
| Example | (% v/v) | $[HNO_3]_a$ | $[H_2SO_4]_a$ | $[HNO_3]_a$ | $[H_2SO_4]_a$ | $[HNO_3]_o$ | $[HNO_3]_o$ | $[H_2SO_4]_o$ |
|---|---|---|---|---|---|---|---|---|
| 22 | 0.91 | 2.92 | 1.00 | 1.75 | 0.97 | 1.17 | 0.26 | 0.03 |
| 23 | (40%) | 2.81 | 2.00 | 1.61 | 1.97 | 1.20 | 0.30 | 0.03 |
| 24 | | 2.80 | 4.00 | 1.50 | 3.96 | 1.30 | 0.39 | 0.04 |
| 25 | | 2.83 | 6.00 | 1.55 | 5.94 | 1.28 | 0.37 | 0.06 |
| 26 | 1.13 | 2.86 | 1.00 | 1.43 | 0.96 | 1.43 | 0.30 | 0.04 |
| 27 | (50%) | 2.85 | 2.00 | 1.40 | 1.96 | 1.45 | 0.31 | 0.04 |
| 28 | | 2.81 | 4.00 | 1.25 | 3.95 | 1.56 | 0.43 | 0.05 |
| 29 | | 2.80 | 6.00 | 1.26 | 5.92 | 1.54 | 0.41 | 0.08 |

EXAMPLES 30–32

Table III shows the results of multistage separation of a mixture of 3 M nitric acid and 1 M phosphoric acid together with predictions based on equilibrium distribution results. The extractant is tri-n-octylamine nitrate in kerosene diluent containing 12% n-decanol. The number of stages used in the extraction section, in which there is counter current contact between extractant and the feed mixture of aqueous acids and in the stripping section, in which there is counter-current contact between the laden extractant phase and water are shown in the Table. The organic to aqueous volume flow ratio in the two sections is given, together with (on the extraction side), the total concentration of nitric acid in the laden extractant and the concentration of aqueous nitric acid left unextracted in the aqueous raffinate and (on the stripping side) the concentration of the product purified nitric acid in the aqueous strip stream. The concentration of phosphoric acid in the product nitric acid stream would however be expected to be always less than 7% of the total acid for all the cases quoted.

TABLE III

Predictions and Examples for the Multi-stage Separation of a Mixture of 3 M Nitric and 1 M Phosphoric Acids

| | | No. of | Extraction | | | Stripping | |
| Example | $[TOAHNO_3]$ M | Stages Extn. Strip | Flow Ratio O/A | Raffinate $[HNO_3]_{aq}$ | Loaded Extractant $[HNO_3]_{org}$ | Flow Ratio O/A | Product $[HNO_3]_{aq}$ M |
|---|---|---|---|---|---|---|---|
| — | 0.21 | 2 | 1.1 | 2.84 | 0.39 | 1.2 | 0.15 |
| — | 0.21 | 2 | 2.2 | 2.62 | 0.38 | 2.2 | 0.41 |
| — | 0.21 | 2 | 4.6 | 2.28 | 0.38 | 4.6 | 0.68 |
| 30 | 0.20 | 2 | 1.25 | 2.78 | 0.39 | 1.0 | 0.19 |
| 31 | 0.21 | 2 | 2.2 | 2.64 | 0.38 | 2.2 | 0.38 |
| 32 | 0.21 | 2 | 4.6 | 2.24 | 0.38 | 4.6 | 0.78 |
| — | 0.43 | 2 | 17 | 0.80 | 0.56 | 5 | 0.74 |
| — | 0.43 | 6 | 10 | 0.68 | 0.64 | 10 | 2.10 |
| — | 0.43 | 10 | 11.5 | 0.46 | 0.65 | 11.5 | 2.50 |

I claim:

1. A method for the separation of nitric acid from a mixture of nitric acid with one or more of phosphoric, sulphuric or hydrochloric acids, in which the nitric acid is selectively extracted from a first phase comprising the acid mixture into a second phase by an amine nitrate.

2. A method according to claim 1, in which the nitrate is of a long chain amine comprising at least 6 carbon atoms in the chain.

3. A method according to claim 1, in which the amine is a secondary or tertiary amine.

4. A method according to claim 1, in which the amine is tri-n-octylamine.

5. A method according to claim 1, in which the second phase comprises a substituted or unsubstituted aromatic or aliphatic hydrocarbon.

6. A method according to claim 1, in which the second phase comprises a modifying substance which suppresses formation of further phases whereby the separability of the first and second phases is improved.

7. A method according to claim 1, in which the total initial acid concentration in the first phase does not exceed 10 M.

8. A method according to claim 1, in which the concentration of the amine nitrate is 5–50% by volume of the first phase.

9. A method according to claim 1, in which the nitric acid extracted into the second phase by the amine nitrate is stripped therefrom by treatment with water or dilute nitric acid.

10. A method for the separation of nitric acid from a mixture of nitric acid and phosphoric acid, comprising selectively extracting the nitric acid from a first phase containing the acid mixture into a second phase with an amine nitrate; and stripping the nitric acid extracted into the second phase from the amine nitrate with water or dilute nitric acid.

11. A method for the separation of nitric acid from a mixture of nitric acid and phosphoric acid, comprising selectively extracting the nitric acid from a first phase containing the acid mixture into a second phase with an amine nitrate.

12. A method for the separation of nitric acid from a mixture of nitric acid and one or more of phosphoric, sulfuric or hydrochloric acids comprising selectively extracting the nitric acid from a first phase containing the acid mixture into a second phase with an amine nitrate and stripping the nitric acid extracted into the second phase from the amine nitrate with water or dilute nitric acid.

* * * * *